(No Model.)
5 Sheets—Sheet 1.

J. F. HAINES.
SODA WATER APPARATUS.

No. 602,257. Patented Apr. 12, 1898.

Witnesses
Frank H. Hight.
A. M. Wilson

Inventor
John F. Haines.
By
Henry C. Evest Attorney (No Model.) 5 Sheets—Sheet 3.

J. F. HAINES.
SODA WATER APPARATUS.

No. 602,257. Patented Apr. 12, 1898.

Witnesses
Frank H Anglin
W. H. Timmermann

Inventor
John F. Haines
By Henry C. Evert Attorney

THE NORRIS PETERS CO., PHOTO-LITHO., WASHINGTON, D. C.

(No Model.) 5 Sheets—Sheet 4.

J. F. HAINES.
SODA WATER APPARATUS.

No. 602,257. Patented Apr. 12, 1898.

Witnesses
Frank N. Anglin
W. H. Timmermann

Inventor
John F. Haines.
By
Henry C. Evert, Attorney (No Model.)  5 Sheets—Sheet 5.

J. F. HAINES.
SODA WATER APPARATUS.

No. 602,257.  Patented Apr. 12, 1898.

Witnesses
Frank N. Anglin
W. H. Timmermann

Inventor
John F. Haines.
By Henry C. Evert Attorney

UNITED STATES PATENT OFFICE.

JOHN F. HAINES, OF FREEPORT, PENNSYLVANIA.

SODA-WATER APPARATUS.

SPECIFICATION forming part of Letters Patent No. 602,257, dated April 12, 1898.

Application filed April 3, 1897. Serial No. 630,620. (No model.)

*To all whom it may concern:*

Be it known that I, JOHN F. HAINES, a citizen of the United States of America, residing at Freeport, in the county of Armstrong and State of Pennsylvania, have invented certain new and useful Improvements in Soda-Water Apparatus, of which the following is a specification, reference being had therein to the accompanying drawings.

This invention relates to certain new and useful improvements in soda-water apparatus, and has for its object to construct a dispensing-fountain having two charging-chambers so connected that one can be used while charging the other, and the operation being performed at the fountain it further aims to provide an auxiliary reservoir to store the superfluous gas remaining in the mixing-chambers to be utilized in recharging the water.

The invention further aims to construct a device which generates the necessary gas for charging the liquid, thereby saving time required to remove the empty gas-retort and supply a full one.

A further object of my invention is to supply a syrup-supply arrangement whereby a given quantity is discharged by means of a foot-operated pump. As the pressure is relieved from the treadle the pipes are so arranged as to allow the excess of syrup to return to the can which is within the receiver or box.

With the above and other objects in view the invention finally consists in the novel construction, combination, and arrangement of parts to be hereinafter specifically described, and particularly pointed out in the claims.

In describing the invention in detail reference is had to the accompanying drawings, wherein like numerals of reference indicate similar parts throughout the several views, in which—

Figure 1:
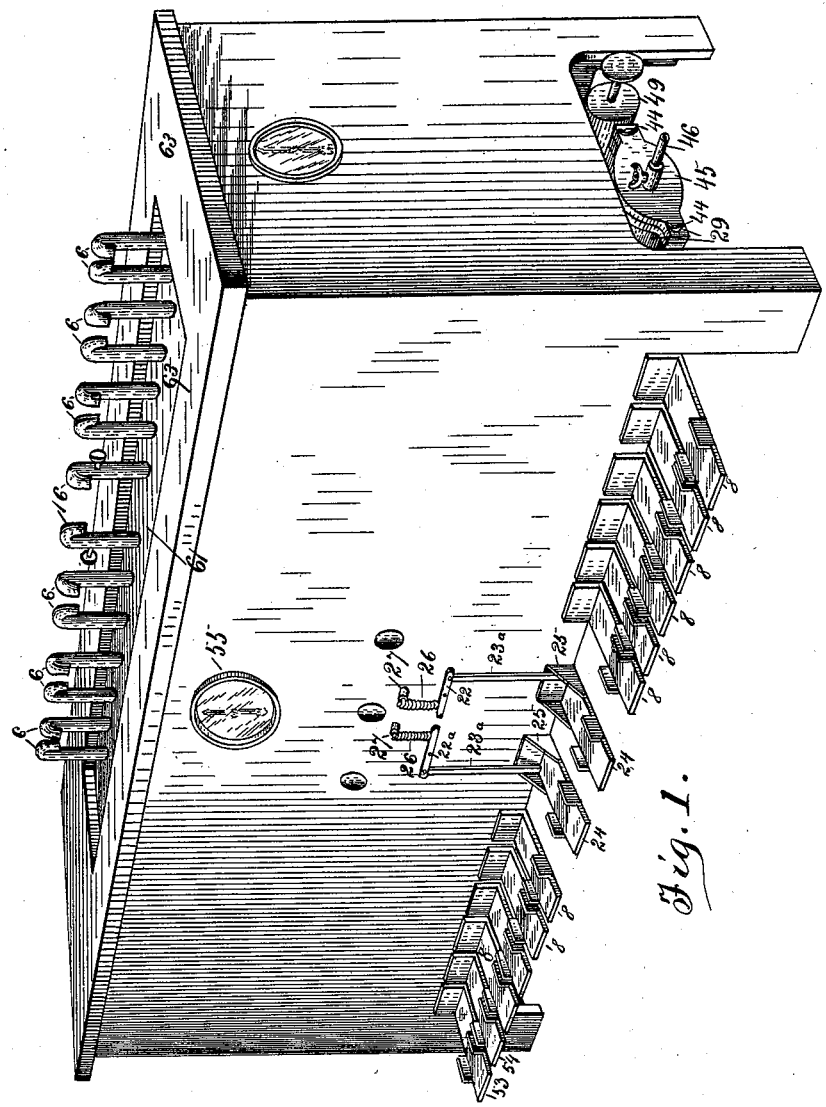
Figure 2:
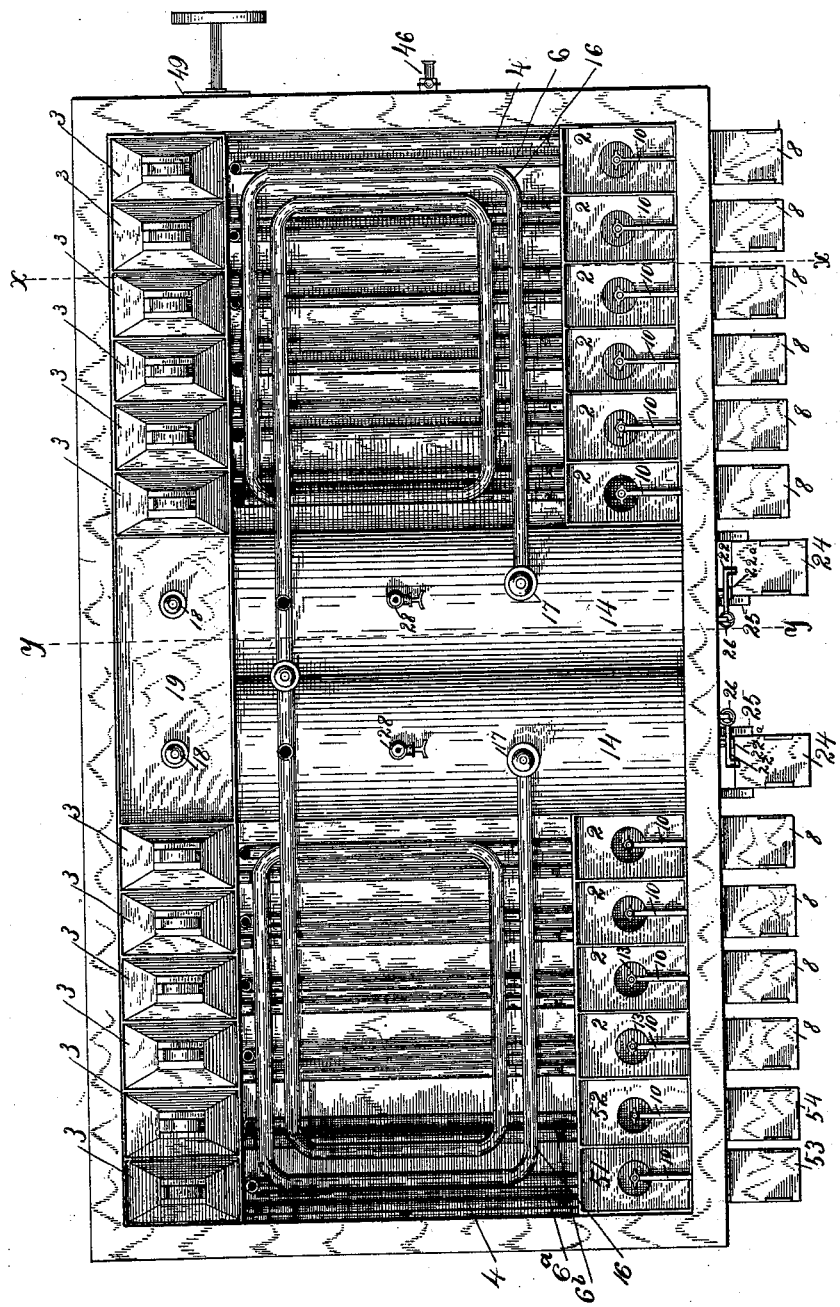
Figure 3:
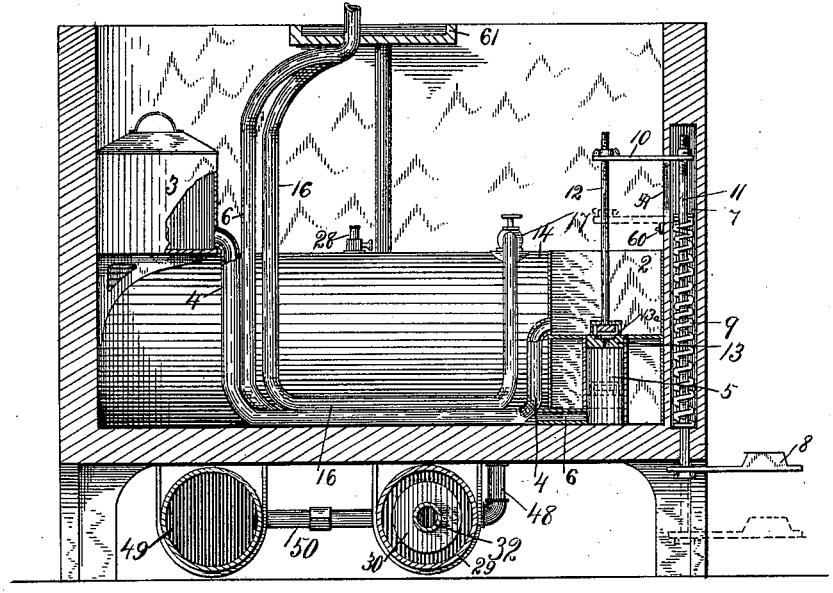
Figure 4:
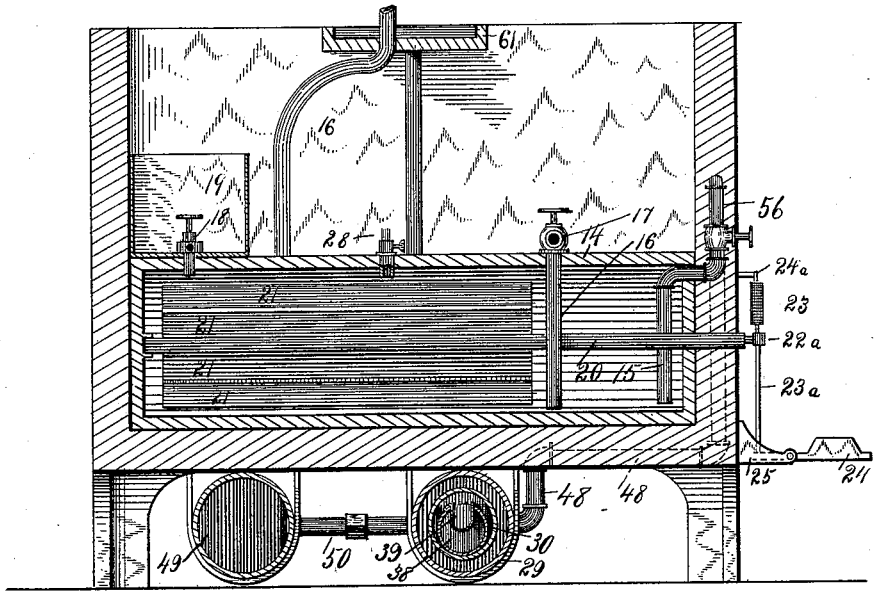
Figure 5:
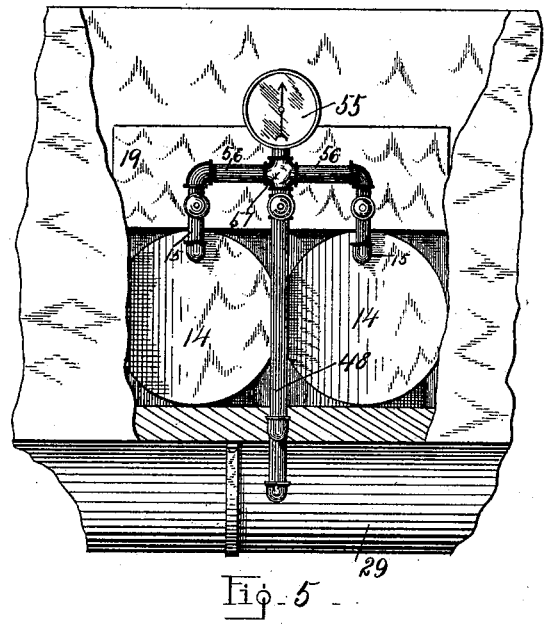
Figure 8:
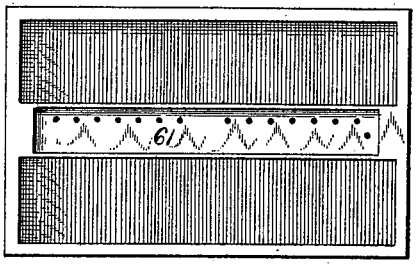
Figure 9:
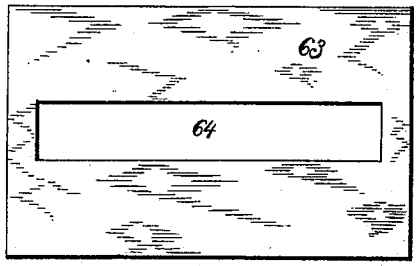
Figure 6:
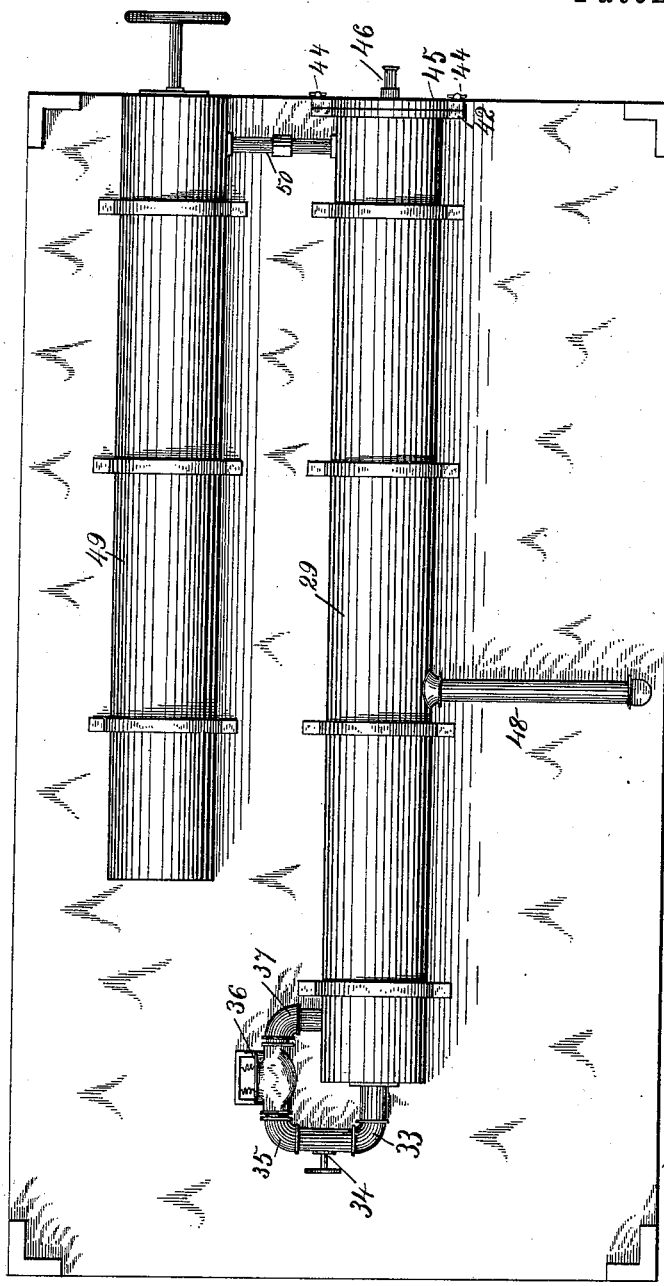
Figure 7:
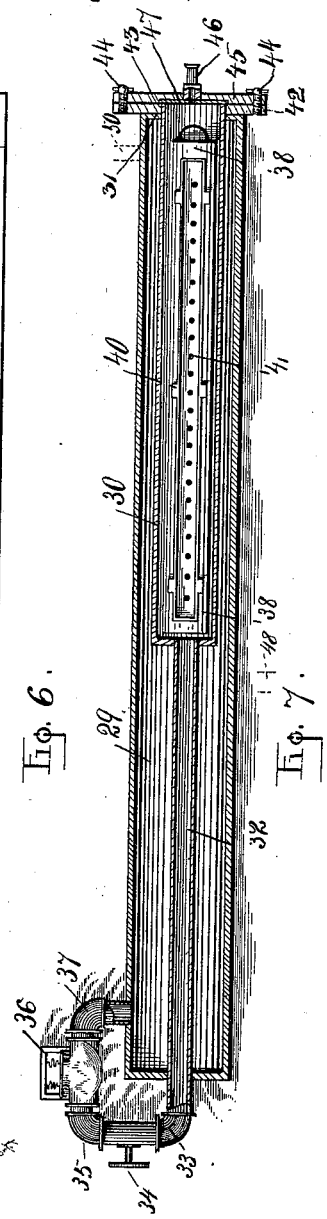

Figure 1 is a perspective view of my improved apparatus. Fig. 2 is a top plan view with bridge removed. Fig. 3 is a sectional view on line X X of Fig. 1. Fig. 4 is a sectional view on line Y Y. Fig. 5 is an end view of the mixing-chamber with the casing removed. Fig. 6 is a bottom plan view of gas-reservoir and gas-retort. Fig. 7 is a longitudinal sectional view of the gas-generating chambers and gas-reservoir. Fig. 8 is a top plan view of the drip-pan and bridge. Fig. 9 is a detached view of the cover.

Referring to the drawings, 1 designates the receiver or box.

2 are syrup-cans connected with syrup-reservoirs 3 by pipes 4. Communicating with the bottom of each of the syrup-cans 2 is a chamber 5, provided with a discharge-pipe 6.

The reservoir or box is provided at its front part with a compartment 7 to receive a rod carrying a treadle 8 and spring 9. The bar 10 connects the rods 11 and 12. To one end of the said rod 12 is secured a valve 13, operating in cylinder 6, which supplies a given quantity of syrup.

14 designates two mixing-chambers provided with gas-supply pipes 15 and a liquid-discharge pipe 16. Said discharge-pipe is provided with a stop-cock 17. Said chamber is also provided with a supply-valve 18, communicating with the auxiliary chamber 19. Journaled in said mixing-chamber is a shaft 20, provided with paddles 21. Secured to one end of the shaft is a lever 22, pivoted at 22$^a$, to operate the paddles for mixing the gas and water. To one side of said lever 22 is pivotally secured a rod 23$^a$, engaging a treadle 24, pivotally secured to brackets 25. To the opposite end of said lever is secured one end of a spiral spring 26, the opposite end secured to the receiver or box at 27. The mixing-chamber is also provided with a discharge-vent 28 to permit the escape of the gas.

29 designates the gas-reservoir. 30 is the gas-generating chamber, secured at one end to the reservoir by means of the flange 31. To the opposite end is secured a pipe 32, passing through the end of the chamber, engaging an elbow 33, carrying a stop-cock 34, an elbow 35 connecting said stop-cock with the escape-valve 36 to allow the escape of gas when the pressure becomes too great, and by means of the elbow 37 connection is made with the gas-reservoir.

The gas-generator 38 is provided with a longitudinal opening on one side carrying a receptacle 39, provided with flanges 40, also having openings 41 in the bottom to permit the acid or the like to flow through and mix with the gas-generating material on the inside.

42 designates a gland secured to the end of the gas-generator, having an opening 43. To said gland is secured, by means of the set-screw 44, a lid or cover 45, provided on one side with a stop-cock 46 and on the opposite side with a rubber disk 47 or like material to form a tight joint. Said gas-reservoir is also provided with a discharge-pipe 48, connected to the gas-supply pipe 15 of the mixing-chamber.

49 designates the usual form of gas-cylinder, and is provided with a pipe 50, communicating with the gas-reservoir 29.

In case of emergencies the ordinary type of gas-cylinder can be connected to the apparatus above described.

Cans 51 and 52 contain a solution of tartaric acid and a solution of carbonate of soda, respectively, which are delivered through the discharge-pipes 6ª and 6ᵇ and can be delivered one at a time or together by operating the treadles 53 and 54 separately or together.

55 designates a gage connected to the pipes 56 56, leading to the gas-reservoir, by means of a four-way connection 57. The pipe 58 engages the four-way connection and leads to the mixing-chamber 14.

The operation is as follows: Water is placed in the auxiliary reservoir 19, and by any suitable means the valve 18 is opened, allowing the water to enter the mixing-chamber 14, when the valve is closed. The gas-generating material is placed in the gas-generator 38. The receptacle 39 is placed in the opening and the acid poured into said receptacle, flowing through the opening 41. The gas-generator is then placed in the gas-generating chamber 30 and the cover 45 secured in position. As the gas is generated it passes out through the pipe 32 into the gas-reservoir 29 and through pipe 48 to the mixing-chamber 14, where by means of the treadle mechanism the paddles thoroughly mix the water and gas. When the pressure becomes too great in the gas-reservoir, it escapes by way of the safety-valve 36. After the water has been thoroughly carbonated it is drawn off through the discharge-pipes 16.

The operation of the syrup-dispensing apparatus is as follows: The syrup is placed in the reservoir 3, having a pipe connecting with the syrup-can 2, the liquid in both cans being at the same level. Communicating with the bottom of the syrup-can is a cylinder 5 to receive a piston 13, provided with an opening 13ª. Attached to said piston is a slidably-mounted rod 12, having an enlarged head forming a valve. To the upper end of said rods 12 and 11 is secured a bar 10. To the lower end of said bar 11 is secured a treadle to operate the piston in one direction. A spring operates the piston in the opposite direction. At each downward stroke of the piston a given amount of syrup is discharged through the pipe 6. The stroke of said pump is limited by the bar 60.

It will also be noted that various changes may be made in the details of construction without departing from the general spirit of my invention.

Having fully described my invention, what I claim as new, and desire to secure by Letters Patent, is—

1. In a soda-water-dispensing apparatus, a syrup-reservoir, a supply-pipe connecting said reservoir and a supply-can, means operating in connection with said can, whereby a given quantity of syrup is dispensed, a mixing-chamber, a gas-generating chamber, supply-pipe connecting said mixing-chamber and gas-generating chamber, and means for dispensing the carbonated liquid, substantially as shown and described.

2. In a soda-water-dispensing apparatus, a mixing-chamber, a gas-reservoir, pipes connecting said chambers, and reservoir, a syrup-reservoir, a syrup-dispensing can, a cylinder communicating with said can, and provided with a discharge-pipe, a piston operating in said chamber, a rod engaging said piston, a bar connecting said rod, and an operating-rod, operating in a compartment, and treadle means for operating said piston, substantially as shown and described.

3. In a soda-water-dispensing apparatus, a syrup-reservoir, a syrup-dispensing can, pipe connections between said reservoir and can, a mixing-chamber, a rotary stirrer journaled in said chamber, and means for operating the same, in combination with a gas-reservoir, a gas-generating chamber located inside said reservoir, and a removable gas-generator, substantially as shown and described.

4. In a soda-water-dispensing fountain, a mixing-chamber, a rotary stirrer journaled in said chamber, a gas-reservoir, pipes connecting said chamber and reservoir, a gas-generating chamber, a gas-generator carried by said generating-chamber, consisting of a cylinder provided with a longitudinal opening in one side, a trough located in said opening, and means for discharging said carbonated liquid, substantially as shown and described.

5. In combination, a soda-water-dispensing apparatus, comprising a mixing-chamber, a rotary mixer journaled in said chamber, an auxiliary chamber communicating with said chamber, a gas-reservoir, a gas-generating chamber, a gas-generator located inside of said chamber, pipes connecting said gas-reservoir and mixing-chamber, and means for dispensing the carbonated beverage, substantially as shown and described.

In testimony whereof I affix my signature in presence of two witnesses.

JOHN F. HAINES.

Witnesses:
 GEO. G. INGERSOLL,
 REUBEN M. HILL.